United States Patent [19]
Yamauchi

[11] Patent Number: 6,154,529
[45] Date of Patent: Nov. 28, 2000

[54] METHOD FOR PROVIDING INFORMATION BY CALLING FROM INFORMATION PROVIDER, AND SERVICE SERVER FOR IMPLEMENTING THE SAME

[75] Inventor: Shin-ichi Yamauchi, Kawasaki, Japan

[73] Assignee: Fujitsu Limited, Kawasaki, Japan

[21] Appl. No.: 08/851,443

[22] Filed: May 5, 1997

[30] Foreign Application Priority Data

Sep. 6, 1996 [JP] Japan ................................. 8-236375

[51] Int. Cl.⁷ .................................................. H04M 15/00
[52] U.S. Cl. ............................ 379/114; 379/112; 379/201
[58] Field of Search ........................... 379/111–115, 119, 379/121, 134, 201, 207; 348/1, 3, 6–8; 705/30, 34–35, 39–40; 395/200.3, 200.33, 200.43, 200.46, 200.47, 200.48, 200.49, 200.59

[56] References Cited

U.S. PATENT DOCUMENTS

| | | | |
|---|---|---|---|
| 5,745,556 | 4/1998 | Ronen | 379/112 |
| 5,771,354 | 6/1998 | Crawford | 395/200.59 |
| 5,815,665 | 9/1998 | Teper et al. | 395/200.59 |
| 5,835,495 | 11/1998 | Ferriere | 370/465 |
| 5,903,892 | 5/1999 | Hoffert et al. | 707/10 |

FOREIGN PATENT DOCUMENTS

| | | |
|---|---|---|
| 63-196157 | 8/1988 | Japan. |
| 5-12574 | 1/1993 | Japan. |
| 6-104682 | 4/1994 | Japan. |
| 6-245019 | 9/1994 | Japan. |
| 6164682 | 10/1994 | Japan. |

*Primary Examiner*—Duc Nguyen
*Attorney, Agent, or Firm*—Helfgott & Karas, PC.

[57] ABSTRACT

Disclosed are a method for enabling information to be provided by calling from an information provider (IP) while preserving user anonymity, and a service server for implementing the same. A user dials a special number followed by an IP number for connection to the IP, and when connected, hears about the contents and fees of information; when the connection with the IP is cut off, a connection between the service server and the user is made to inquire whether he has the intention of entering into a contract. When the user confirmed his intention to enter into the contract, a user number is assigned to the user, and the assigned number is stored in the service server and, at the same time, reported to the IP. The IP can provide information, while preserving the anonymity of the user, by dialing a special number followed by the user number.

9 Claims, 12 Drawing Sheets

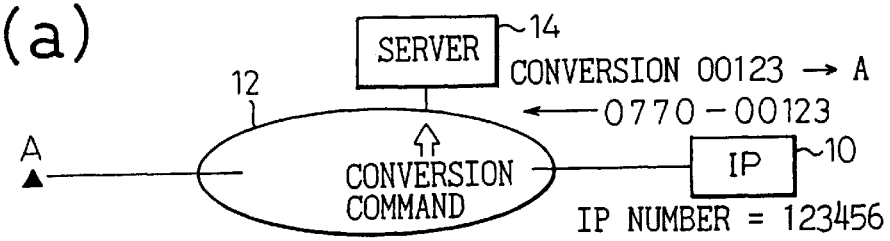
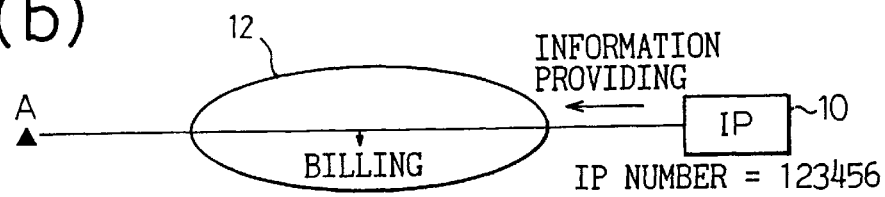
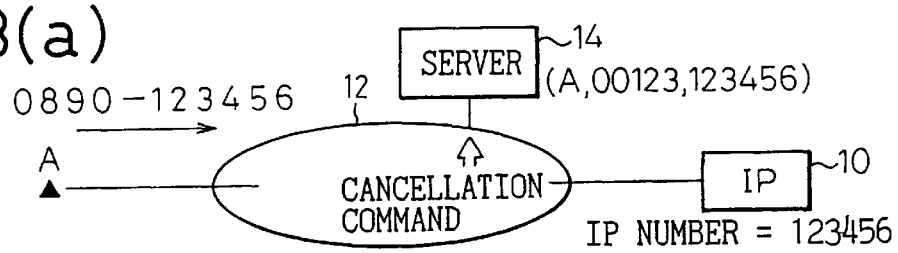
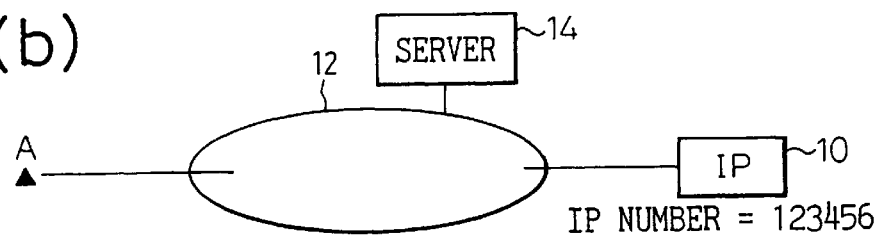
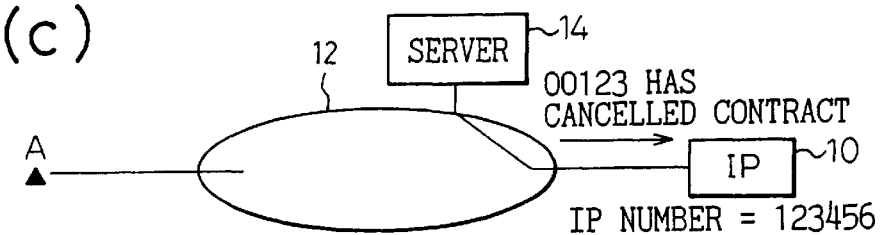

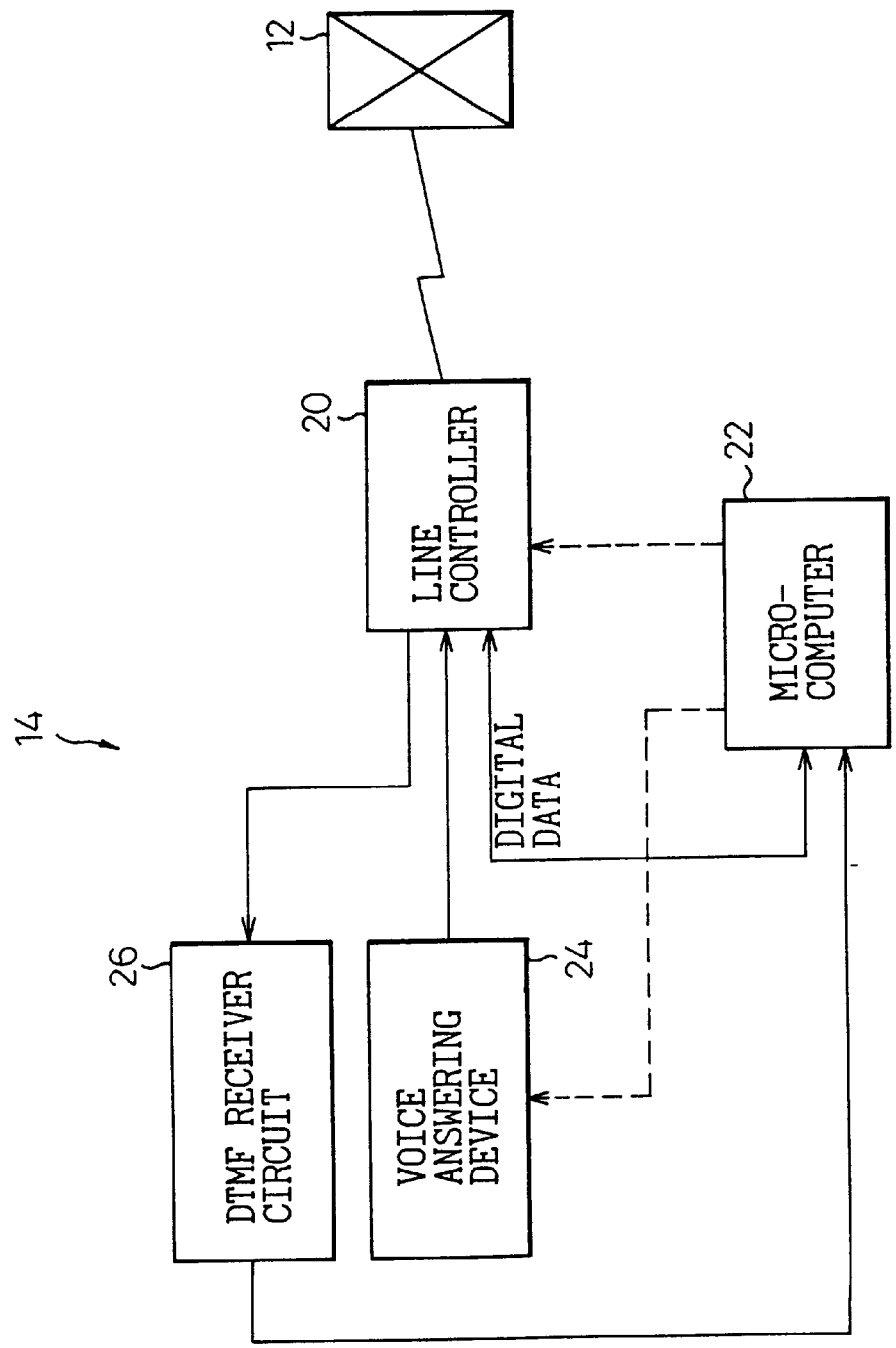

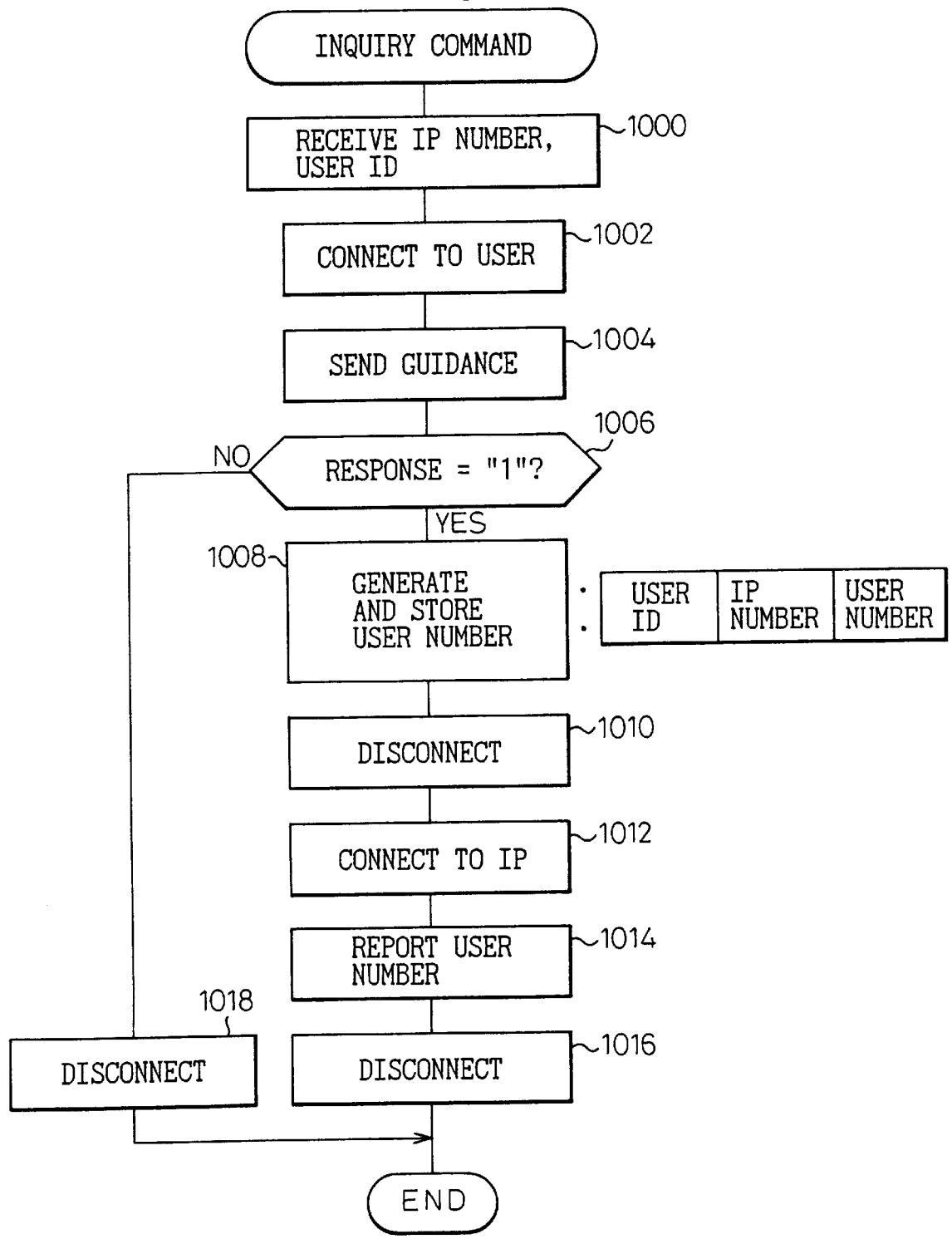

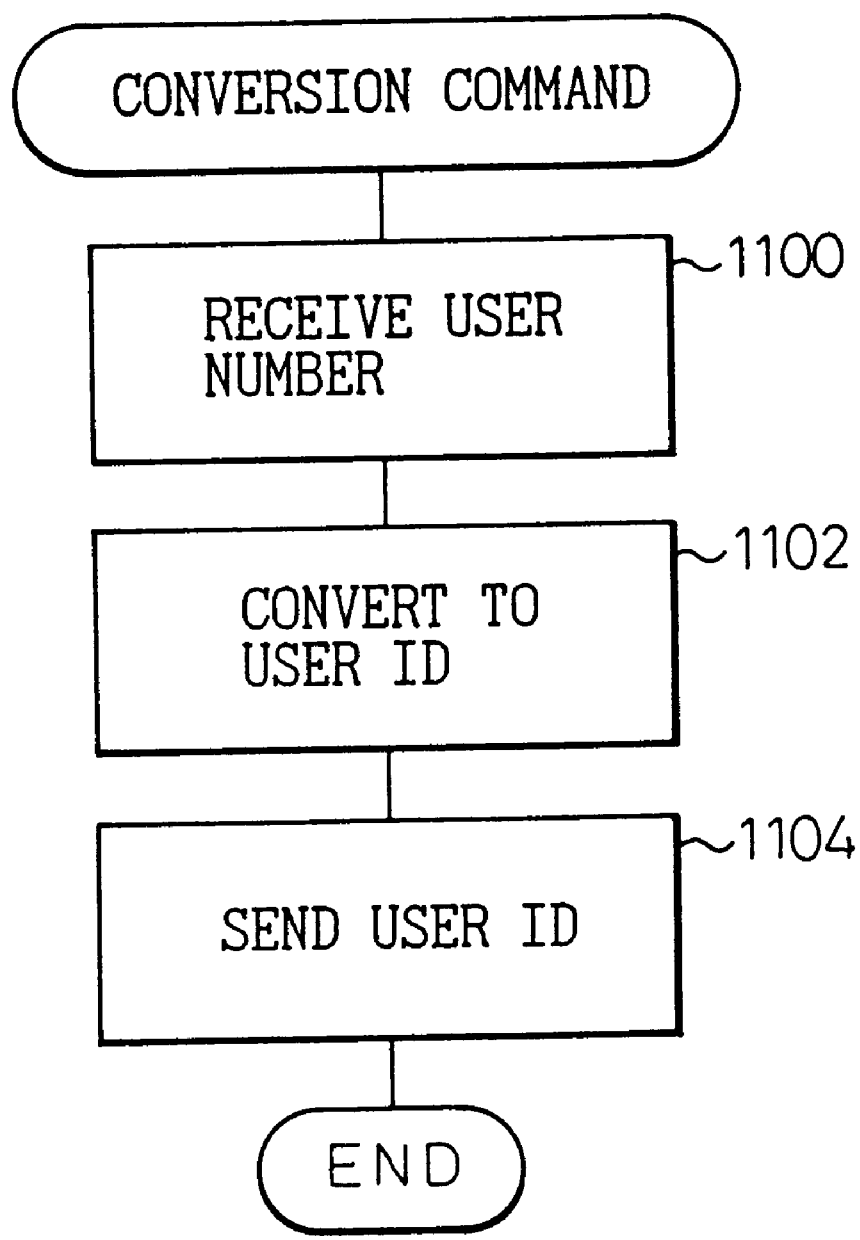

Fig.11(e)

| USER ID | USER NUMBER | IP NUMBER |
|---|---|---|
|   |   |   |
| A | 00123 | 123456 |
|   |   |   |

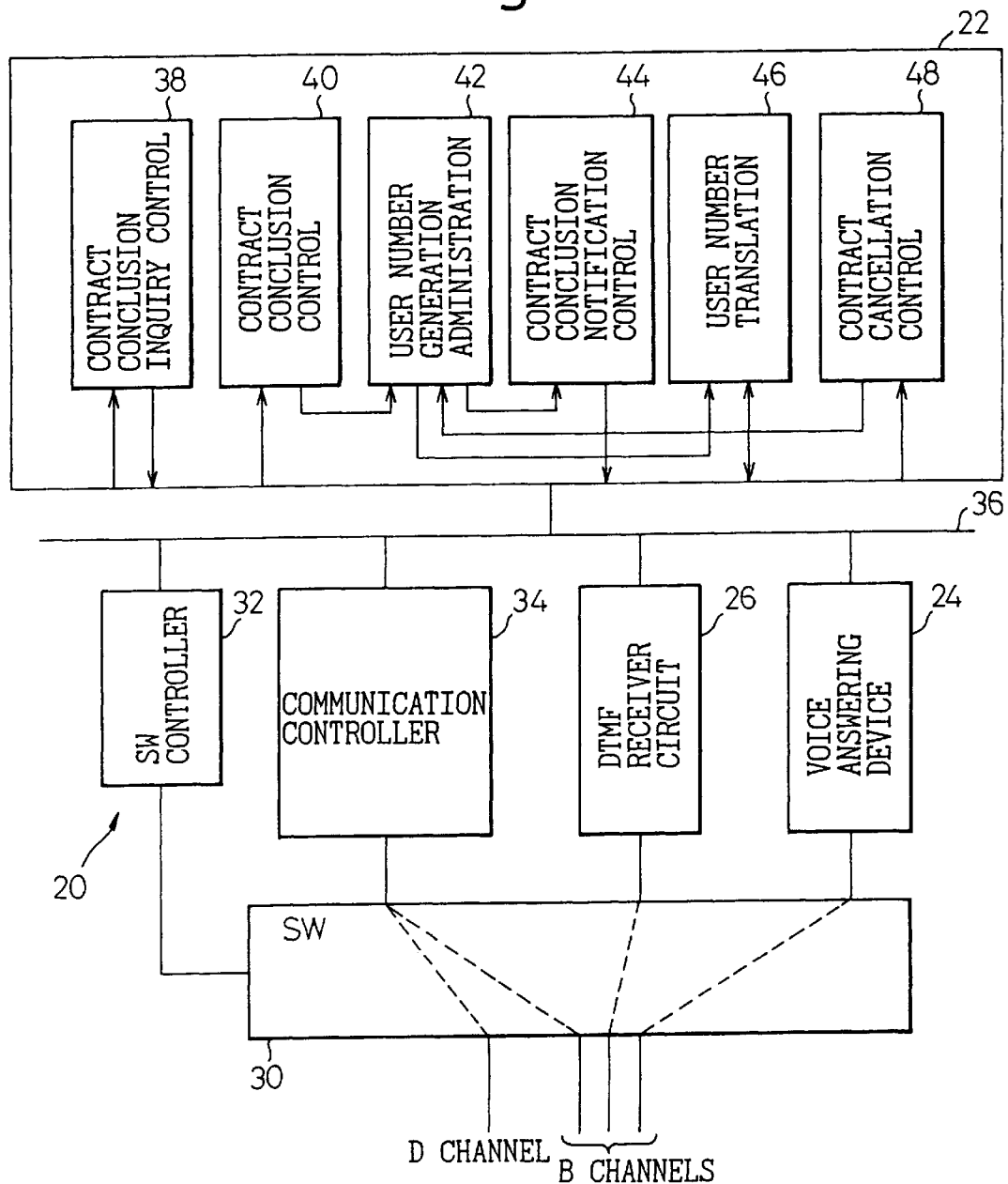

METHOD FOR PROVIDING INFORMATION BY CALLING FROM INFORMATION PROVIDER, AND SERVICE SERVER FOR IMPLEMENTING THE SAME

BACKGROUND OF THE INVENTION

1. Field of the Invention

The present invention relates to a method for providing information on a one-shot or a regular basis to a user by calling from an information provider (IP), and a service server connected to a communication network for implementing the same method.

2. Description of the Related Art

A service is widespread in which a user is connected to an IP of his choice by dialing a telephone number with a special prefix (0990 in Japan, 900 or 976 in the U.S.A.) and the common carrier collects an information fee from the user on behalf of the IP by including it in the user's regular phone bill (Dial $Q^2$ service in Japan, 900 or 976 service in the U.S.A.). This kind of service not only offers the advantage that the information fees can be collected at low cost and without fail, but also has the characteristic that the user can preserve his anonymity.

However, since this kind of information providing service essentially requires that the user make a call to establish a communication line to receive information from the information provider, the following problems arise when it comes to providing information that cannot be supplied immediately upon the user's request or information that is expected to arise in the future on a regular basis.

(1) The user needs to know by some other means whether the information he needs is available at the IP side, and the IP also needs to inform the user when it is ready to provide the information. This involves a complicated procedure for both the user and the IP.

(2) If a contract is made in writing or the like in advance between the IP and a plurality of users, the IP can provide information on a regular basis, but to achieve this, the contract has to be made by mail or other means than the communication network. This also involves a complicated procedure.

(3) In the case of (2), the anonymity of the users cannot be preserved.

(4) In the case of (2), information fees must be collected by some other means.

SUMMARY OF THE INVENTION

It is an object of the present invention to provide an information providing method by which information can be provided on a one-shot or a regular basis to users by using only a communication network and by calling from an IP while preserving the anonymity of the users and also retaining the ability to collect information fees on behalf of the IP. It is also an object of the invention to provide a service server, connected to the communication line, for implementing the same method.

According to the present invention, there is provided a method for providing information by calling from an information provider, comprising the steps of: recording an information providing contract that is concluded between a user and the information provider via a first communication path established by calling from the user, while preserving anonymity of the user; and specifying in response to a call made by the information provider the user who has concluded the information providing contract with the calling information provider on the basis of the recorded information providing contract, and thereby enabling information to be provided from the information provider to the user.

There is also provided a service server which, by being connected to a communication network, enables information to be provided by calling from an information provider, comprising: means for recording an information providing contract that is concluded between a user and the information provider via a first communication path established by calling from the user, while preserving anonymity of the user; and means for specifying in response to a call made by the information provider the user who has concluded the information providing contract with the calling information provider on the basis of the recorded information providing contract, and thereby enabling information to be provided from the information provider to the user.

BRIEF DESCRIPTION OF THE DRAWINGS

FIGS. 2(a) and 2(b) are diagrams showing an outline of an information providing procedure;

FIGS. 3(a) to 3(c) are diagrams showing an outline of a contract cancellation procedure;

FIG. 4 is a hardware block diagram of a service server according to the present invention;

FIG. 5 is a flowchart illustrating the operation of a microcomputer in FIG. 4 in the contract conclusion procedure;

FIG. 6 is a flowchart illustrating the operation of the microcomputer in the information providing procedure;

FIGS. 11(a) to 11(f) are diagrams showing an outline of a procedure up to the conclusion of an information providing contract when the service server is implemented as a subscriber terminal served by an exchange within a network;

FIG. 13 is a diagram showing the detailed configuration of the service server when the network is an ISDN.

DESCRIPTION OF THE PREFERRED EMBODIMENTS

FIGS. 1(a) to 1(f) concern an information providing method according to the present invention, showing an outline of a procedure from the time that an information providing contract is made in advance between a user and IP via a communication network, until the conclusion of the contract is recorded in a service server.

Figure 1A:
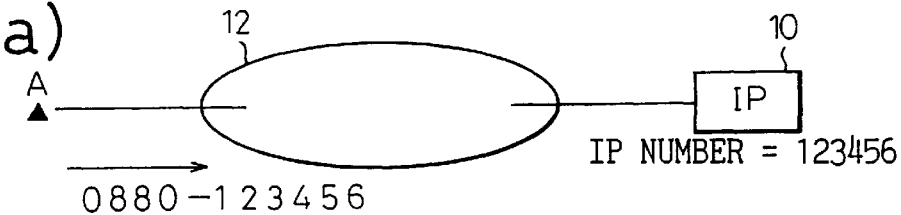
FIGS. 1(a) to 1(f) are diagrams showing an outline of a procedure up to the conclusion of an information providing contract.
Figure 1B:

In FIG. 1(a), user A goes off-hook and dials the number "123456" of the information provider (IP) 10 following a special number, for example, "0880", for making a contract. When this number is received by a network 12, the network 12 connects the user A to the IP 10, as shown in FIG. 1(b).

Figure 1C:
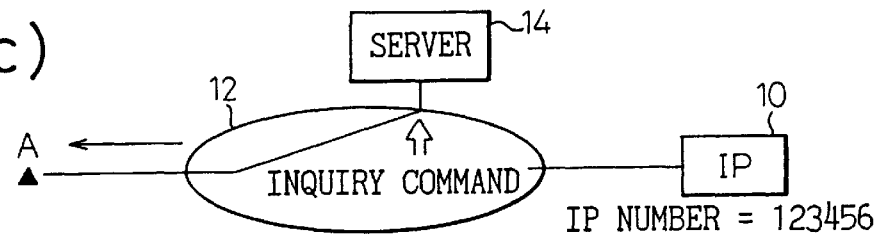
Figure 1D:
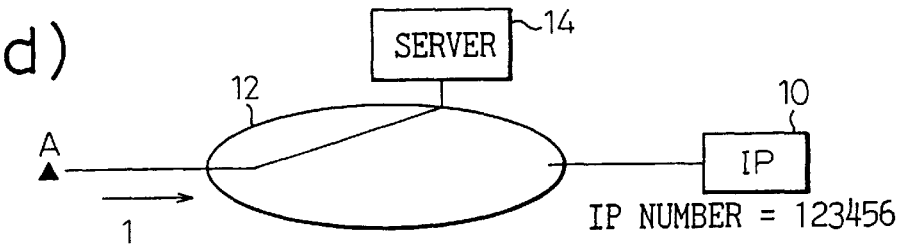
Figure 1E:
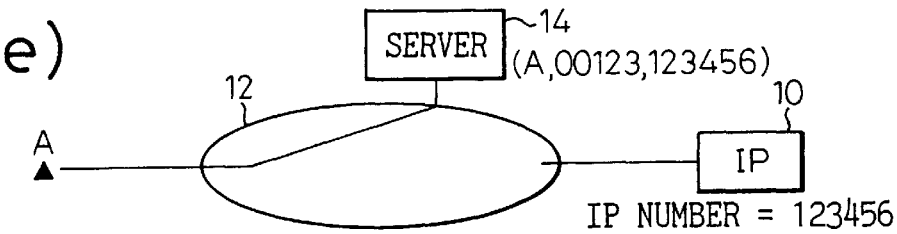
Figure 1F:
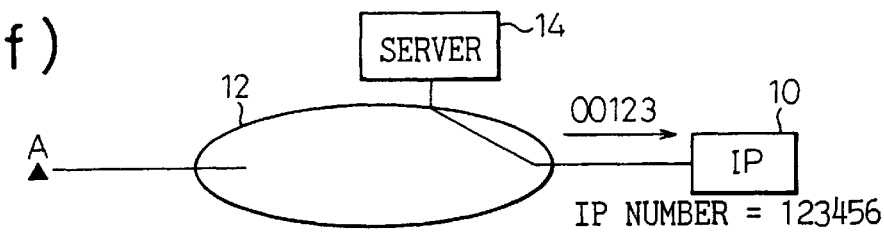

Through this connection, the user A can communicate with the IP 10 to hear the contents of information and the contract terms including fees. When the connection between the user A and the IP 10 is cut off, a command to inquire about the conclusion of the contract is issued to the service server 14 connected to the network 12, as shown in FIG. 1(c), and in response, the service server 14 is connected to the user A. Through this connection, the server 14 inquires of the user A whether he has the intention of concluding the information providing contract with the IP 10. When the user A dials "1" indicating his intention to conclude the contract, as shown in FIG. 1(d), the server 14 assigns a user number "100123" to the user A, and stores the assigned user number in a memory by associating it with the caller identifier (telephone number) and IP number, as shown in FIG. 1(e). Then, as shown in FIG. 1(f), the IP 10 is notified of the assigned user number as well as the user's confirmed intention to conclude the contract.

The user number here is assigned only for the purpose of discriminating among a plurality of users having information providing contracts with the IP 10. That is, when a plurality of users have contracts with the same IP, each user is assigned a different user number, but knowing the user number alone does not provide the actual identification of the user that has concluded the contract, unless the association between the user number and the actual user is known. Since only the user number is reported to the IP 10, the user's anonymity can be preserved. Further, when providing the same information to all the users under contract with the IP 10, such as the information of a periodical, there is no need to distinguish each individual user at the IP side, and therefore, the assignment of user numbers is not necessary. In that case, the server 14 has only to store the association between the user telephone number and the IP number and notify the IP 10 only of the fact that the user's intention to conclude the contract has been confirmed.

FIGS. 2(a) and 2(b) shows a procedure for providing information from the IP to the user in the information providing method according to the present invention. In FIG. 2(a), when the user number "00123" is dialed from the IP 10 following a special number "0770" for providing information, a conversion command is issued from the network 12 to the service server 14. In response to the conversion command, the server 14 converts the user number "00123" to the telephone number of the user A. Using this number, the network 12 connects the IP 10 to the user A, as shown in FIG. 2(b). The IP 10 can now provide information to the user A. The information fee that accrues from this service is charged to the user A.

FIGS. 3(a) to 3(c) show a procedure when the user A cancels his contract in the information providing method according to the present invention. In FIG. 3(a), when the user A dials the number "123456" of the IP 10 following a special number "0890" for contract cancellation, a cancellation command is issued from the network 12 to the service server 14. In response to the cancellation command, the service server 14 erases the record concerning the association between the user number "00123", the user A, and the number of the IP 10 (FIG. 3(b)), and notifies the IP 10 that the information providing contract with the user A has been cancelled (FIG. 3(c)). After that, if the IP 10 attempts to provide information by dialing 0770-00123, the IP 10 will not be connected to the user A since the association between the user number "00123" and the user A recorded in the service server 14 has already been erased.

With the above procedures, for information that cannot be supplied immediately upon the user's request, or information that arise a plurality of times irregularly or regularly, the user can subscribe to the information service by dialing the IP with the prefix "0880", for example, so that the information can be provided to the user for a fee by the IP calling the user with the prefix "0770", for example, as the IP becomes ready to provide the information or as the information arises.

The service server 14 can be implemented, for example, as part of the facilities of an exchange within the network 12 by providing the server facility in the network 12 itself, or as a subscriber terminal served by an exchange. FIG. 4 shows one example of the hardware configuration of the service server 14 in the latter case. The former case also can be implemented easily according to the description hereinafter given.

In FIG. 4, a line controller 20 controls the connection of a line with the network 12 under the control of a microcomputer 22. A voice answering device 24, under the control of the microcomputer 22, generates a voice guidance, which is sent out to the network 12 via the line controller 20. A DTMF receiver circuit 26 converts the DTMF (dual tone multifrequency) signals received from the network 12 via the line controller 20 into corresponding numbers and sends them to the microcomputer 22. The microcomputer 22 transmits and receives various commands and digital data such as telephone numbers to and from the network 12 via the line controller 20, while controlling the line controller 20 and the voice answering device 24.

The software configuration of the microcomputer 22 will be described using a flowchart illustrating the operation of the microcomputer 22.

FIG. 5 shows the operation of the microcomputer 22 when the connection with the IP established by calling from the user is cut off and the contract conclusion inquiry command is issued from the network 12 in the information providing contract recording procedure shown in FIG. 1.

When the contract conclusion inquiry command is issued from the network 12, first the user ID (telephone number) of the calling user and the IP number of the called IP are received from the network 12 (step 1000), a connection is made to the user by using the user ID (step 1002), and a guidance to inquire of the user whether he agrees to enter into the information providing contract with the IP is output from the voice answering device 24 (FIG. 4) in the form of a voice message (step 1004). If the user dialed, for example, "1" in response (step 1006), it is determined that the user confirmed his intention to enter into the contract, and a user number is generated and stored in a memory of the microcomputer 22 along with the user ID and IP number associated with it (step 1008). Next, the connection with the user is cut off (step 1010), and a connection is made to the IP (step 1012) to notify the IP of the conclusion of the contract and the user number (step 1014), after which the line is disconnected (step 1016).

FIG. 6 shows the operation when the conversion command is issued from the network in the procedure of FIG. 2 for providing information from the IP to the user. In step 1100, the user number to be converted is received and, by referring to the association stored in the memory, the user number is converted to the user ID (step 1102), which is then returned to the network (step 1104).

Figure 7:
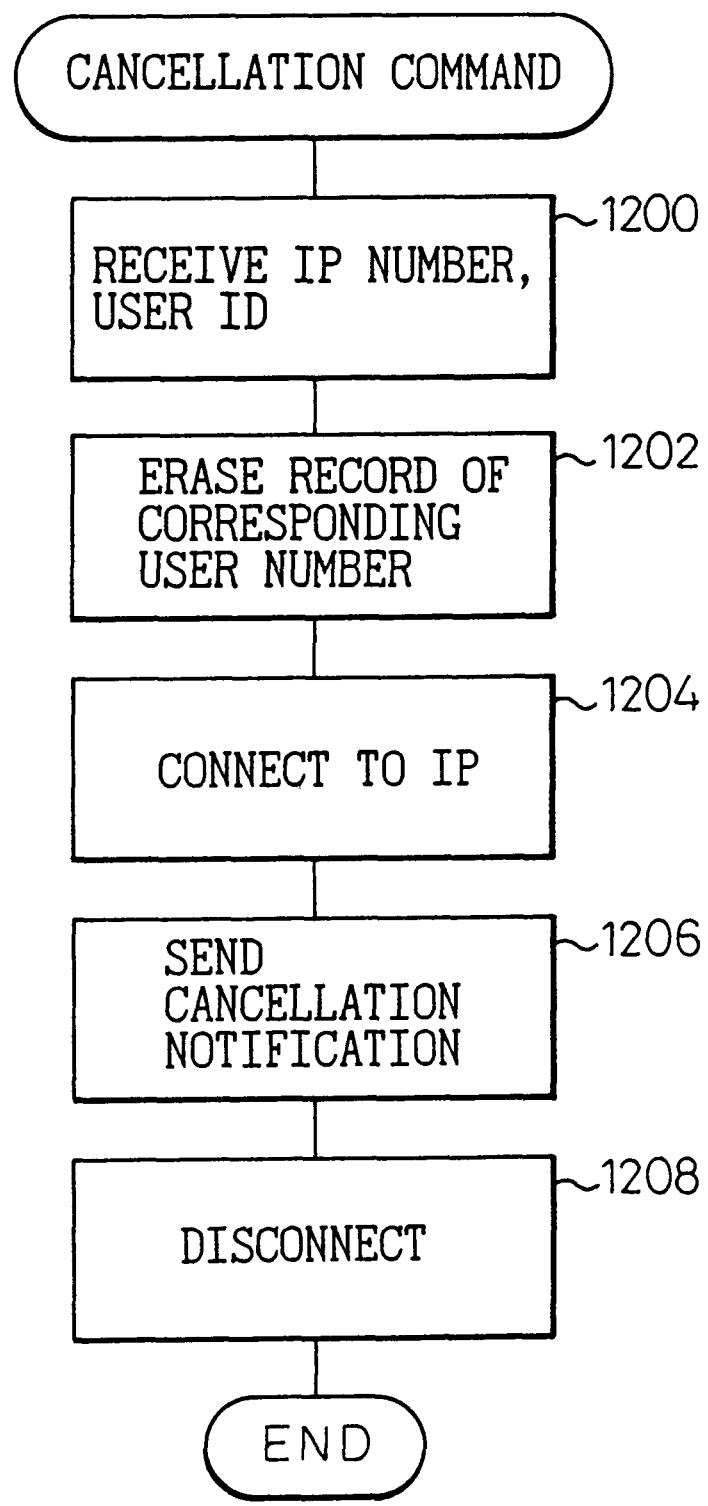
FIG. 7 is a flowchart illustrating the operation of the microcomputer in the contract cancellation procedure.

FIG. 7 shows the operation when the cancellation command is issued from the network 12 in the contract cancellation procedure shown in FIG. 3. In step 1200, the user ID and IP number are received from the network 12, and the record of the corresponding user number is erased (step 1202). Next, a connection is made to the IP (step 1204) to notify the IP of the cancellation of the contract (step 1206), after which the connection with the IP is cut off (step 1208).

Figure 8:
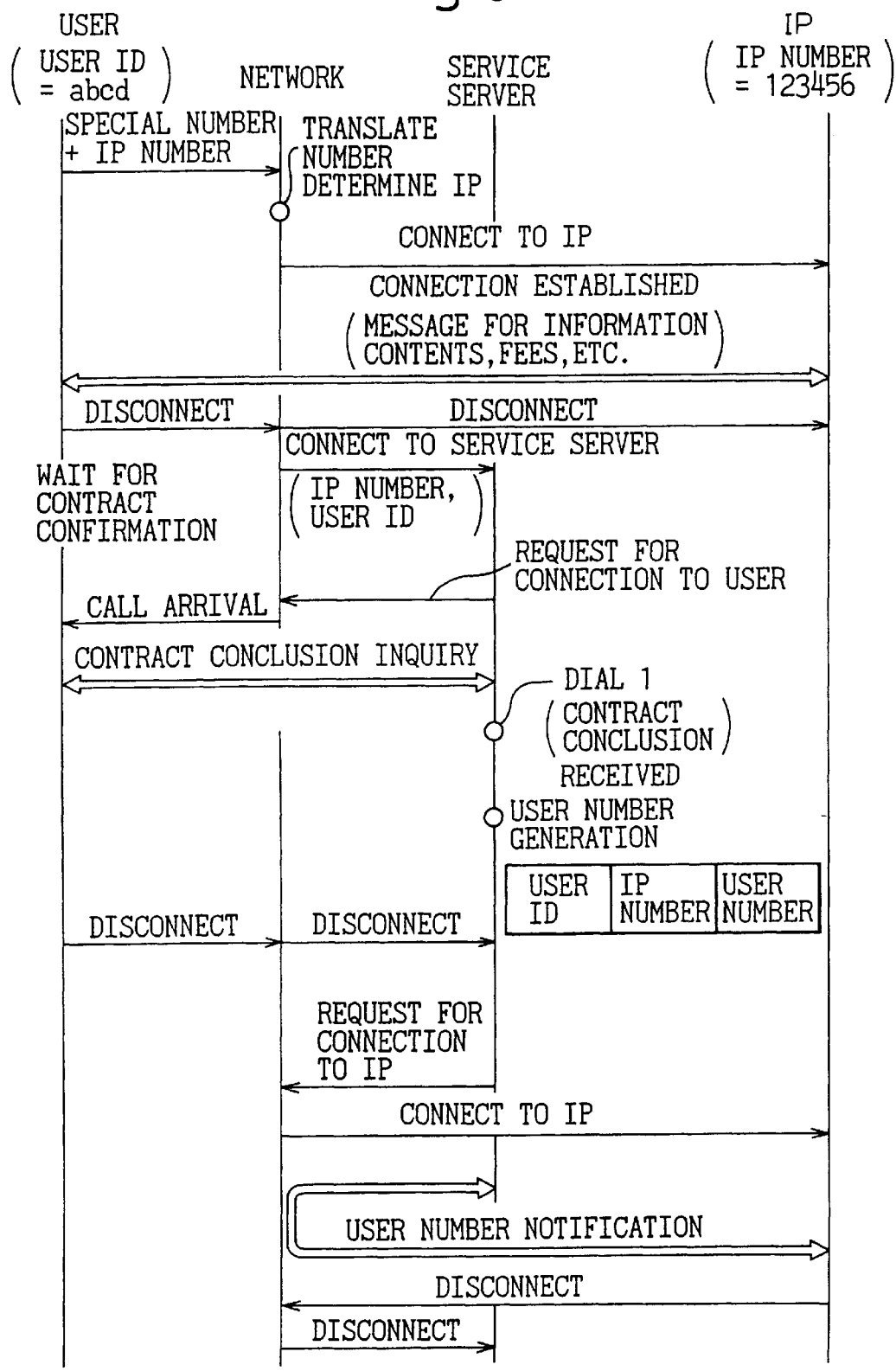
FIG. 8 is a signal sequence diagram in the contract conclusion procedure.

FIG. 8 shows a sequence diagram of signals transferred among the user, the network, the service server, and the IP in the information providing contract recording procedure of FIG. 1. In FIG. 8, when the user dials the special number followed by the IP number, the network translates the received number, recognizes that the user desires to know the contents of a information providing contract with the specified IP, and routes the connection to the IP to connect the user to the IP. Through this connection, the user can communicate with the IP to hear the contents of the information, service fees, etc. When the user goes off-hook, the network connects to the service server to notify the service server of the IP number of the IP and the user ID of the user. In response, the service server requests the network for a connection with the user, and when connected with the user, inquires of the user whether he has the intention of concluding the contract. When the dial number "1" indicating the user's intention to enter into the contract is received by the service server, the service server generates a user number and stores it. When the user goes off-hook, the service server connects to the IP to notify the IP of the user number.

Figure 9:
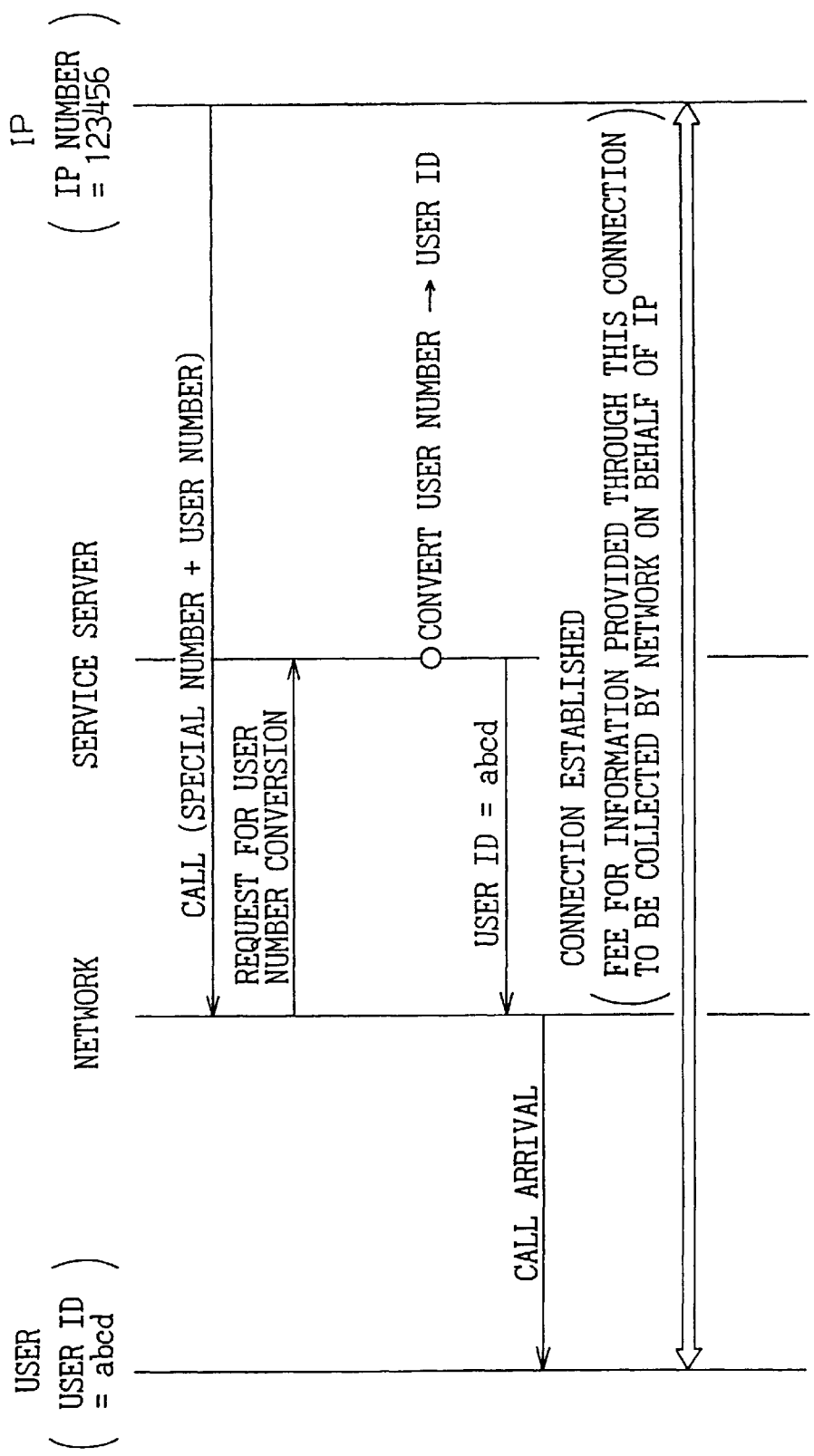
FIG. 9 is a signal sequence diagram in the information providing procedure.

FIG. 9 shows a sequence diagram of signals transferred among the user, the network, the service server, and the IP in the procedure for providing information from the IP. In FIG. 9, when the IP dials the special number followed by the user number, the network requests the service server to convert the user number to the user ID. In response, the service server converts the user number to the corresponding user ID, and using this user ID, the network routes the connection to the user to connect the IP with the user. Through this connection, the IP provides information to the user. The information fee that accrues from this service is collected by the network on behalf of the IP.

Figure 10:
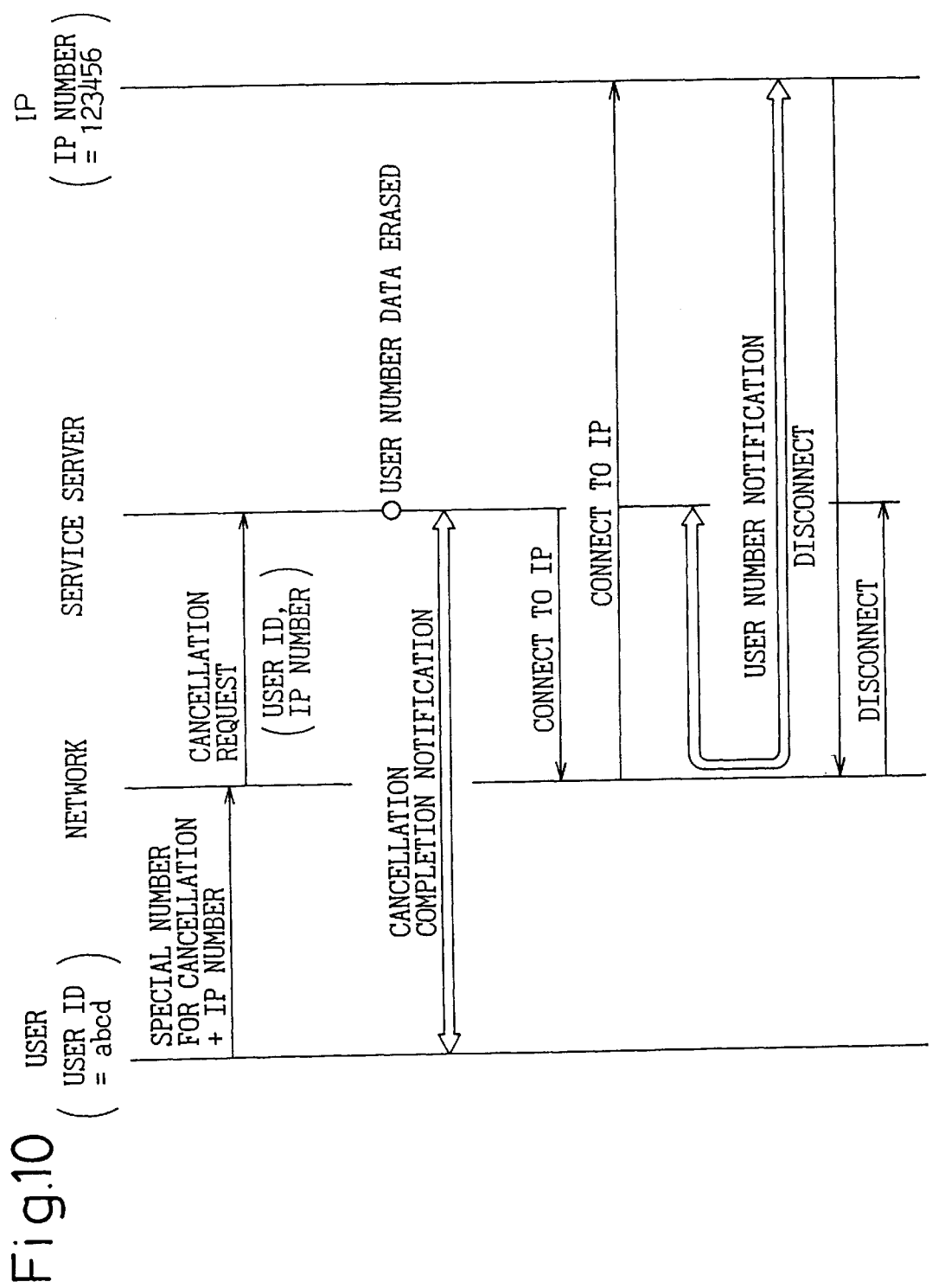
FIG. 10 is a signal sequence diagram in the contract cancellation procedure.
Figure 11A:
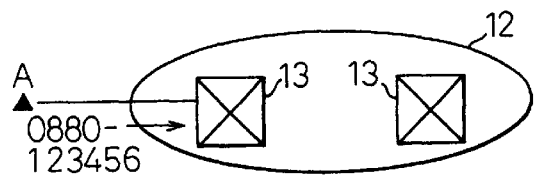
Figure 11B:
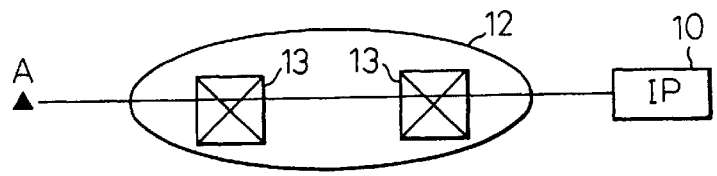
Figure 11C:
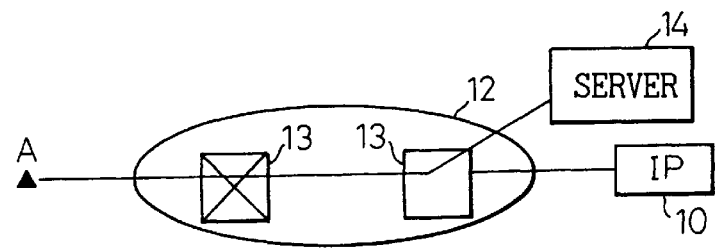
Figure 11D:
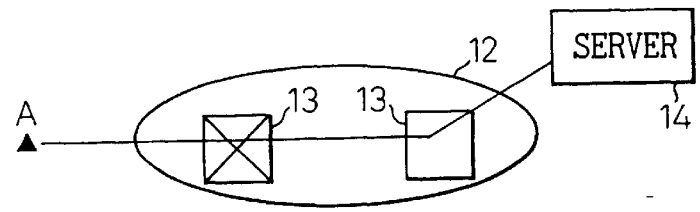
Figure 11F:
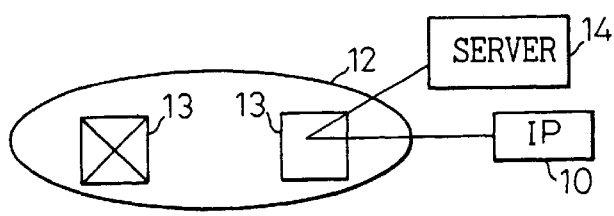

FIG. 10 shows a sequence diagram of signals transferred among the user, the network, the service server, and the IP in the contract cancellation procedure. In FIG. 10, when the user dials the special number for cancellation followed by the IP number, the network sends a cancellation request to the service server along with the user ID and IP number. In response, the service server erases the data of the corresponding user number, and notifies the user that the contract has been cancelled. Further, the service server connects to the IP to notify the IP of the user number of the user whose contract has been cancelled.

Figure 12A:
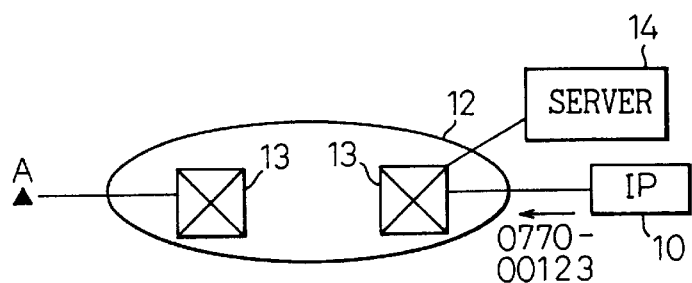
FIGS. 12(a) and 12(b) are diagrams showing an outline of an information providing procedure when the service server is implemented as a subscriber terminal served by an exchange within a network.
Figure 12B:
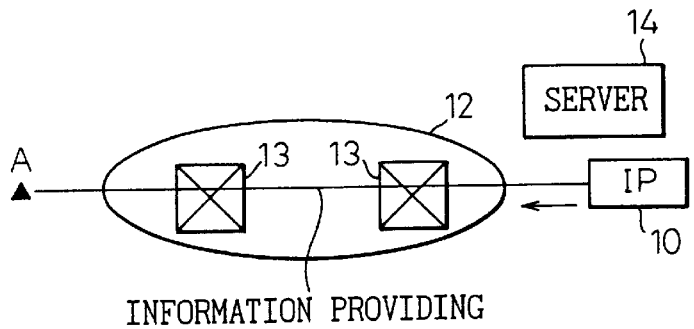

FIGS. 11(*a*) to 11(*f*) and FIGS. 12(*a*) and 12(*b*) show the configuration in which the service server 14 is implemented as a subscriber terminal served by an exchange 13 within the network 12: FIGS. 11(*a*) to 11(*f*) and FIGS. 12(*a*) and 12(*b*) correspond to FIGS. 1(*a*) to 1(*f*) and FIGS. 2(*a*) and 2(*b*), respectively. The same component elements as those shown in FIGS. 1(*a*) to 1(*f*) and FIGS. 2(*a*) and 2(*b*) are designated by the same reference numerals, and descriptions of such parts will not be repeated here. FIGS. 11(*a*) to 11(*f*) and 12(*a*) and 12(*b*) show that the service server 14 and the IP 10 are served by the same exchange, but it will be appreciated that they may be disposed so as to be served by different exchanges. FIG. 11(*e*) shows one example of a table for storing user numbers each associated with its corresponding user ID (telephone number) and IP number.

If the network 12 is an integrated services digital network (ISDN), the usual SETUP message can be used as a request to establish each of the connections shown in FIGS. 11(*b*) and 11(*f*) and FIGS. 12(*a*) and 12(*b*). In FIG. 11(*b*), the message sent from the exchange 13 to the service server 14 upon disconnection of the IP 10 can also be structured as a SETUP message, but in that case the IP number, the user ID, and the information indicating that the message is a contract conclusion inquiry command, are included as user information in the SETUP message. When the service server 14 responds to this SETUP message, the user is connected to the service server 14, as shown in FIG. 11(*c*). In FIG. 12(*a*), the conversion command sent from the exchange 13 to the service server 14 can be transmitted over a main information channel of the ISDN.

FIG. 13 shows the detailed configuration of the service server 14 when the network 12 is an ISDN. The same component elements as those shown in FIG. 4 are designated by the same reference numerals, and descriptions of such parts will not be repeated here. The line controller 20 described with reference to FIG. 4 comprises a switch 30, a communication controller 34, and a switch controller 32. The communication controller 34 transmits and receives control messages such as the SETUP message over the D channel of the ISDN. The switch controller 32 controls the switch 30 to connect the B channels of the ISDN to the DTMF receiver circuit 26, the voice answering device 24, and the communication controller 34. More than one B channel is used to simultaneously provide a service to a plurality of users. The switch controller 32, the communication controller 34, the DTMF receiver circuit 26, the voice answering device 24, and the microcomputer 22 are interconnected via a bus 36.

In the block of the microcomputer 22, the functions implemented in software of the microcomputer 22 are each shown in the form of a functional block. A contract conclusion inquiry control block 38, in response to the contract conclusion inquiry command from the network, sends a message via the voice answering device 24 to inquire of the user whether he has the intention of entering into the contract. A contract conclusion control block 40 receives a user response via the DTMF receiver circuit 26, and if the user confirms his intention to enter into the contract, instructs a user number generation administration block 42 to generate a user number. In response to this instruction, the user number generation administration block 42 generates a user number and stores it, and notifies a contract conclusion notification control block 44 of the completion of user number registration. In response to this notification, the contract conclusion notification control block 44, after being connected to the IP, notifies the IP of the completion of the contract conclusion procedure. A user number translation block 46, in response to the conversion command from the network, converts the user number to the user ID in accordance with the user number/ID combination stored in the user number generation administration block 42. A contract cancellation control block 48 erases the record of the user number in response to the contract cancellation command from the network.

In this way, the user can conclude a contract with the IP while preserving his anonymity, receive information from the IP, and cancel the contract with the IP when necessary. Furthermore, to enter into a contract with the IP only requires communicating over a public network, and there is no need at all to go through complicated procedures such as the submission of a written contract. As for the payment, the network collects charges on behalf of the IP, so that the payment can be settled without directly communicating with the IP.

What is claimed is:

1. A method for providing audible information that can be directly handled by a telephone terminal to a telephone terminal by calling from an information provider, comprising the steps of:

(a) recording an information providing contract that is concluded between a user and the information provider via a first communication path established by calling from the user, while preserving anonymity of the user; and (b) specifying in response to a call made by the information provider the telephone terminal of the user who has concluded the information providing contract with the calling information provider on the basis of the recorded information providing contract, and thereby enabling information to be provided from the information provider to the telephone terminal of the user via a second communication path.

2. A method according to claim 1, further comprising the step of (c) erasing the recorded information providing contract when requested by the user.

3. A method according to claim 1, further comprising the step of (d) charging on behalf of the information provider for the information provided via the second communication path.

4. A method according to claim 1, wherein step (a) includes the substeps of:

(i) assigning the user one of user numbers which are used to distinguish among a plurality of users who have concluded information providing contracts with the information provider while preserving the anonymity of the users;

(ii) storing an association between the user number, the user, and the information provider; and (iii) notifying the information provider of the user number, and step (b) includes the substep of:

(i) specifying the user who has concluded the information providing contract, based on the user number received from the information provider and on the stored association.

5. A method for providing information by calling from an information provider, comprising the steps of:

(a) recording an information providing contract that is concluded between a user and the information provider via a first communication path established by calling from the user, while preserving anonymity of the user; and (b) specifying in response to a call made by the information provider, the user who has concluded the information providing contract with the calling information provider on the basis of the recorded information providing contract, and thereby enabling information to be provided from the information provider to the user via a second communication path;

wherein step (a) includes the substeps of:

(i) assigning the user one of user numbers which are used to distinguish among a plurality of users who have concluded information providing contracts with the information provider while preserving the anonymity of the users;

(ii) storing an association between the user number, the user and the information provider; and (iii) notifying the information provider of the user number;

wherein step (b) includes the substeps of:

(i) specifying the user who has concluded the information providing contract, based on the user number received from the information provider and on the stored association;

wherein substep(a)(i) includes the substep of:

confirming the user's intention to enter into the contract via a third communication path after the first communication path has been disconnected; and assigning the user number after the intention to enter into the contract has been confirmed.

6. A service server which, by being connected to a communication network, enables audible information that can be directly handled by a telephone terminal to be provided by calling from an information provider to a telephone terminal comprising:

means for recording an information providing contract that is concluded between a user and the information provider via a first communication path established by calling form the telephone terminal of the user, while preserving anonymity of the user; and means for specifying, in response to a call made by the information provider, the telephone terminal of the user who has concluded the information providing contract with the calling information provider on the basis of the recorded information providing contract, and thereby enabling audible information that can be directly handled by a telephone terminal to be provided from the information provider to the telephone terminal of the user via a second communication path.

7. A service server according to claim 6, further comprising means for erasing the recorded information providing contract when requested by the user.

8. A service server according to claim 6, wherein the contract recording means includes:

means for assigning the user one of user numbers which are used to distinguish among a plurality of users who have concluded information providing contracts with the information provider while preserving the anonymity of the users;

means for storing an association between the user number, the user, and the information provider; and means for notifying the information provider of the user number, and the user specifying means includes:

means for specifying the user who has concluded the information providing contract, based on the user number received from the information provider and on the stored association.

9. A service server which, by being connected to a communication networks, enables information to be provided by calling from an information provider, comprising:

means for recording an information providing contract that is concluded between a user and the information provider via a first communication path established by calling from the user, while preserving anonymity of the user; and means for specifying, in response to a call made by the information provider, the user who has concluded the information providing contract with the calling information provider on the basis of the recorded information providing contract, and thereby enabling information to be provided from the information provider to the user via a second communication path;

wherein the contract recording means includes:

means for assigning the user one of user numbers which are used to distinguish among a plurality of users who have concluded information providing contracts with the information provider while preserving the anonymity of the users;
means for storing an association between the user number, the user and the information provider; and
means for notifying the information provider of the user number;
wherein the user specifying means includes:
means for specifying the user who has concluded the information providing contract, based on the user number received from the information provider and on the stored association;
wherein the user number assigning means includes:
means for confirming the user's intention to enter into the contract via a third communication path after the first communication path has been disconnected; and
means for assigning the user number after the intention to enter into the contract has been confirmed.

* * * * *